United States Patent [19]

Franzen

[11] 4,379,734

[45] Apr. 12, 1983

[54] MULTISTAGE EVAPORATOR

[75] Inventor: Paul Franzen, Koblenz, Fed. Rep. of Germany

[73] Assignee: FA. Maschinenfabrik Buckau R. Wolf AG, Grevenbroich, Fed. Rep. of Germany

[21] Appl. No.: 252,122

[22] Filed: Apr. 8, 1981

[30] Foreign Application Priority Data

Apr. 29, 1980 [DE] Fed. Rep. of Germany ....... 3016406

[51] Int. Cl.³ ............................................. B01D 1/26
[52] U.S. Cl. .................................. 159/17 R; 62/238.5; 62/238.7; 159/47.1; 159/20 R; 159/24 A; 159/24 B; 203/25
[58] Field of Search ................ 159/17 R, 20 R, 24 A, 159/24 B, 24 R, 47; 202/173, 174; 203/24, 26, 25; 62/238.5, 238.6, 238.7

[56] References Cited

U.S. PATENT DOCUMENTS

| | | | |
|---|---|---|---|
| 3,084,107 | 4/1963 | McMahon | 159/24 B |
| 3,489,654 | 1/1970 | Geiringer | 159/24 B |
| 4,023,946 | 5/1977 | Schwartzmann | 202/173 |

*Primary Examiner*—Norman Yudkoff
*Attorney, Agent, or Firm*—Michael J. Striker

[57] ABSTRACT

A multistage evaporator plant having combined vapor compressor and heat pump for recovery of the heat contained in the vapors. The evaporator section comprises several stages and a heat input, a condensate output and a vapor output. The vapor compressor can comprise a steam jet injector connected to a source of booster steam for providing steam power and connected to the heat input of the evaporator section, a distributor valve connected to an input of the steam jet injector. The heat pump can comprise an absorber connected to the condensate output of the evaporator and to the heat input of the evaporator on its output side, and to a port of the distributor valve, a heat exchanger connected via feed and return line to the absorber, a pressure reducing valve connected via the heat exchanger to the feed line, a boiler connected to the pressure reducing valve to receive feed and having an output for a return depleted mixture, a pump connected to the output for the depleted mixture of the boiler and to the return line via the heat exchanger, a condenser connected to the boiler and a control valve connected to the distributor valve and to the boiler heating provision for controlling the amounts of vapors required in the absorber and the boiler heating supply.

The apparatus results in considerable decreases of energy expenditures compared to conventional apparatus.

30 Claims, 2 Drawing Figures

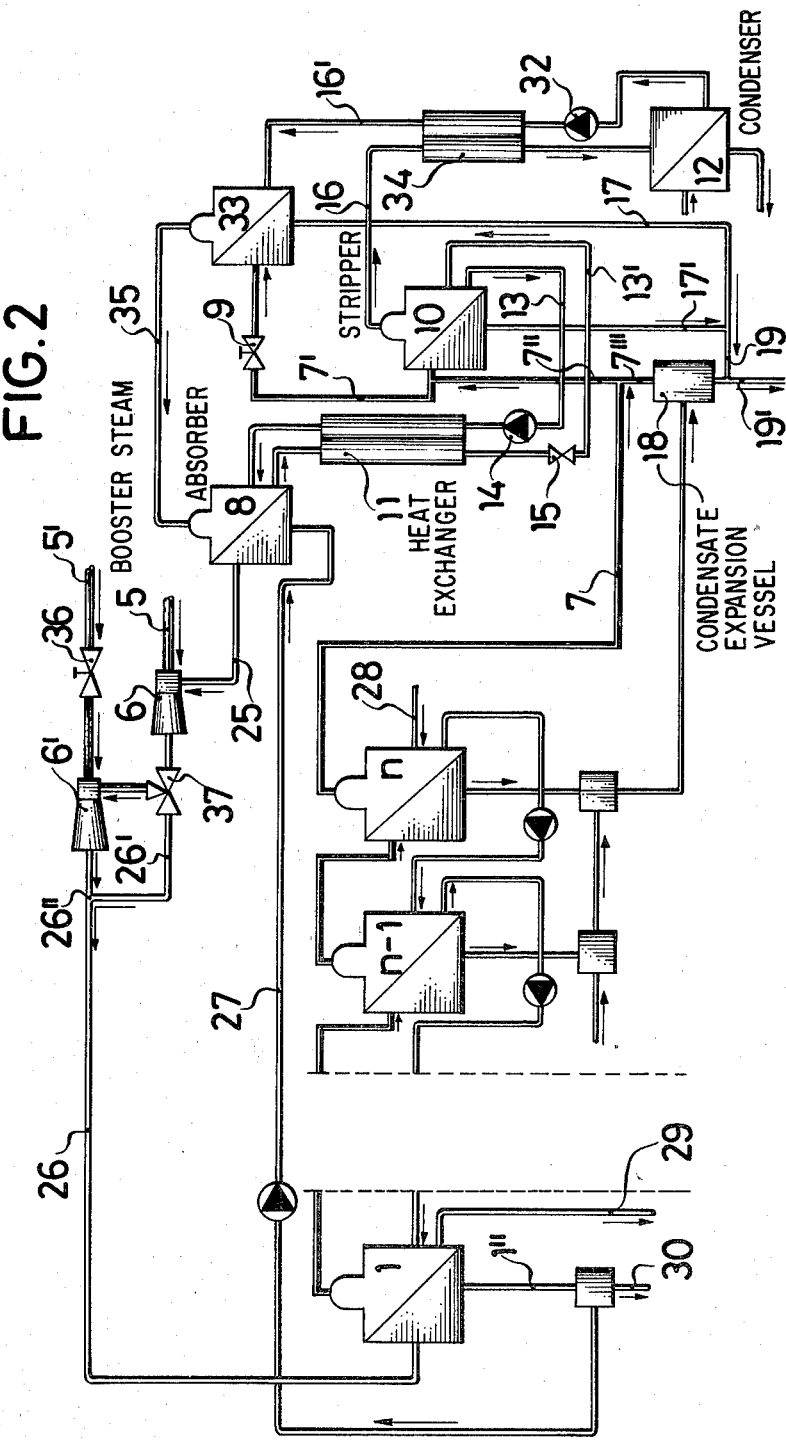

MULTISTAGE EVAPORATOR

DESCRIPTION

BACKGROUND OF THE INVENTION

1. Field of the Invention

The present invention relates to a multistage evaporator plant featuring combined vapor compressor and heat pump for regeneration of the heat contained in the vapors.

2. Brief Description of the Background of the Invention Including Prior Art

At present multistage evaporator plants, evaporator plants with vapor compressors or combined multistage evaporators with vapor compressors are employed for reducing the process energy use in thermal processes for separating materials. The energy savings are achieved in multiple stage evaporators by employing the heat contained in the vapors of the individual evaporator stages for heating the next stage in each case. The vapors of the last evaporator stage are liquefied in vapor condensers and the condensate is removed into the environment, since it is in general not possible to economically use the heat contained in these vapors. Possibly the evaporation enthalpy of the vapors can be used for a preheating of the solution to be concentrated, however since the amount of evaporation enthalpy is always larger than the amount of heat which can be transferred to the solution, the largest part of the vapor heat has to be removed into the environment without use. The optimum number of stages and thus the possible energy savings with multistage evaporators is determined by the technical, thermodynamical and especially the economical constraints, since the evaporation processes can only be performed within certain temperature ranges determined by the properties of the materials, the available process steam temperatures and the material data of the solutions to be evaporated and since further the capital and maintenance expenditures with increasing number of stages begin to increase in a larger proportion compared to the energy savings.

Another possibility of economically employing high value energy in evaporation processes comprises to compress the vapors to the higher heating vapor pressure and to feed them back as process steam to the evaporator, which is in most cases the apparatus where they were generated. It is known in the art to compress the vapors by way of mechanical compressors as well as with steam jet injectors. The compression of the vapors with mechanical compressors is however economically and thermodynamically only reasonable in cases where large amounts of vapor are processed and where the ratio between the pressure of the vapors and the pressure of the heating steam is as small as possible. In producing plants the advantageous temperature difference between the vapors and the heating steam is 10 K. to 20 K. and beyond these temperature differences mechanical vapor compressors do not work economically.

Instead of the expensive and in many cases considerable maintenance requiring mechanical compressors the less expensive and sturdier steam jet injectors can be employed. The injector compressor requires a considerable amount of booster steam for each kg of vapors and the amount of booster steam required becomes the larger the smaller the difference between the vapor temperature and the booster steam temperature is and the larger the difference between the vapor and heating steam temperature is. However, since the required amount of heating steam does not considerably exceed the amount of vapors, it can be concluded that only part of the vapors can be compressed while the balance is removed to the environment as waste heat unless there is some other use.

Therefor, since with increasing temperature difference between the vapors and the heating steam the energy use for the operation of the compressors and/or the technical expenditures increase rapidly, a combination of multistage evaporators and vapor compressors is uneconomical and does not make sense in view of energy use if the aim is to use as far as possible the difference between process steam and environmental temperature in the evaporator part and further to lift up the vapor temperature as low as possible of the last stage by way of a vapor compressor to the level of the process steam. The advantages of the one system as saving of energy by using the large temperature difference between the vapors of the last stage and the heating steam for the first stage of the multistage evaporator can completely balance the advantages of the other system as the less the temperature difference between vapors and heating steam, the less is the energy expenditure in the vapor compressors.

SUMMARY OF THE INVENTION

1. Purposes of the Invention

It is an object of the present invention to provide a method and apparatus for employing the vapor heat in evaporation processes for the provision of process steam such that the advantages of the vapor compression can be obtained without giving up the advantages of multistage evaporators.

It is another object of the present invention to provide a process and apparatus resulting in considerable decreases of the energy expenditure in the process when compared with plants of comparable capacity.

It is another object of the present invention to provide a process where the heat recovered from the vapors is available as process steam.

These and other objects and advantages of the present invention will become evident from the description which follows.

2. Brief Description of the Invention

The present invention provides a multistage evaporator plant with heat recovery system combining vapor compressors with apparatus operating as a heat pump. Employing the heat recovery system the heat energy present in the vapors of the last evaporator stages is used such that with a minimal use of higher valued energy the vapors are revaluated to the level of process heat and are fed back to the first or one of the earlier evaporator stages as process heat. Such plants are employed in the thermal chemical engineering such as for example in the concentration of solutions or with distillation processes and serve in this context to further reduce the amount of process energy required versus conventional plants.

There is provided a method for multiple stage evaporating which comprises compressing part of the exhaust vapor to provide process steam with a vapor compressor, pumping another part of the exhaust vapor of the evaporator with a heat pump for production of process steam, feeding process steam to the first stage of a multiple stage evaporator and returning part of the cooled process steam to the heat pump.

Part of the exhaust vapor of the evaporator can be compressed to process steam with a steam jet injector. Preferably compressing and heat pumping are performed simultaneously. The vapor resulting from one or more of the evaporator stages can be fed completely to a heat pump for transforming at least part of the vapor into steam of higher energy and the vapor can be pressurized to a suitable process pressure in a vapor compressor. The vapor resulting from the vapor compressor can be admixed to the process steam for operating the stages of the multiple stage evaporator. Steam under high pressure can be fed as booster steam via a by-pass line to a steam jet injector serving as a vapor compressor to provide process steam, additional high pressure steam can be reduced to process steam by an additional steam jet injector and the process steam from the steam jet injectors can be fed to the first evaporating stage. Alternatively, steam under high pressure can be fed as booster steam via a by-pass line to a steam jet injector serving as a vapor compressor to provide process steam, the additional high pressure steam can be reduced to process steam through a throttle and water injection and the process steam can be fed to the first evaporating stage.

Steam can be expanded to the level of the steam resulting from the compressor via a thermal engine and the thermal engine can drive a compressor providing the compressing of the vapor. Vapor can be fed from the evaporating stages to an absorber containing an unsaturated multicomponent mixture and the vapor can be absorbed with the multicomponent mixture. After the absorbing the now saturated multicomponent mixture called rich solution can be fed via a pipe to a boiler which is under lower pressure compared to the absorber. The enriched solution can provide heat to a heat exchanger and the enriched solution can be expanded in a throttle. The saturated multicomponent mixture can be regenerated by evaporating the absorbed components under heat consumption. The regenerated depleted multicomponent mixture and the saturated multicomponent mixture can exchange heat for warming the depleted mixture. The heat employed in the boiler can have a temperature as desired when compared with the temperature of the vapor fed to the absorber.

The vapors intended for the heat pump can be fed back to a boiler stage and an evaporating stage. Low boiling components of a multicomponent mixture can be vaporized in the boiler stage at low pressure and the low boiling components can be liquefied in a condenser. A pump can pump the liquefied low boiling components into an evaporating stage being under high pressure and the low boiling components can be vaporized again by contact with the vapors. Then the low boiling components can be absorbed in an absorption stage into the depleted multicomponent mixture under generation of heat. The now unsaturated multicomponent mixture can be throttled through a valve or nozzle connected to the absorber to a pressure corresponding to that of the boiler stage and the throttled saturated multicomponent mixture can be fed to the boiler. Upon depletion in the boiler the multicomponent mixture can be removed from the boiler and be pumped back to the absorber standing under a higher pressure, whereupon the saturated and the depleted mixture are heat contacted at the higher pressure as under the higher pressure standing liquid low boiling components with the vaporized low boiling components after the boiling step. The vaporized components leaving the boiler stages can be condensed at low temperatures or at room temperature. The heat contained in the vapor condensates of the evaporator stages belonging to the evaporator can additionally be employed for heating the boiler and/or the evaporating stages of the heat regenerator.

There is also provided a multistage evaporator which comprises an evaporator section including a plurality of evaporating stages, a vapor compressor connected to the evaporating stages and a heat pump connected to the evaporating stages. The vapor compressor can be a steam jet injector.

One or more of the evaporator stages can be in part connected to the steam jet injector and in part to the heat pump. The heat pump can transform the vapor fed from one or more of the evaporator stages fed to the heat pump and a compressor can be connected to the heat pump for compressing the vapor to the required process pressure. An additional steam jet injector can be connected to the first evaporation stage. The vapor compressor can be a mechanical compressor and a thermal engine can be connected to the mechanical compressor for driving the same and for expanding steam to the level of the steam leaving the mechanical compressor. The heat pump can comprise an absorber fed with vapor. The heat pump can further comprise a heat exchanger connected to the absorber, a pump connected to the heat exchanger, a throttle connected to the heat exchanger and a boiler connected with the liquid input to the throttle and connected with the liquid output ot the pump. The heater for the boiler can be fed with vapors from one or more stages of the evaporator.

In one aspect of the invention the multistage evaporator comprises an evaporator section having a heat input, a condensate output and a vapor output, a vapor compressor including a source of steam, a steam jet injector connected to the source of steam for providing steam power and to the heat input of the evaporator section, a distributor valve connected to an input of the steam jet injector and a heat pump including an absorber connected to the condensate output of the evaporator and to the heat input of the evaporator on its output side and to a port of the distributor valve, a heat exchanger connected via a saturation line and a depletion line to the absorber, a pressure reducing valve connected via the heat exchanger to the saturation line, a boiler connected to the pressure reducing valve to receive feed and having an output for depleted mixture, a pump connected to the output for depleted mixture of the boiler and to the depletion line of the absorber via the heat exchanger, a condenser connected to the boiler and a control valve connected to the distributor valve and to the boiler heating provision for controlling the amounts of vapors required in the absorber and the boiler heating supply. The vapor output of the last evaporator stage can be connected to the distributor valve.

There can also be provided a vaporizer connected to the control valve and the absorber. A heat exchanger can be connected between the boiler and the condenser and between the condenser and the vaporizer. A pump can be disposed in the line from the condenser to the vaporizer and can be located between heat exchanger and condenser.

A second steam jet injector can be provided connected between the distributor valve and the absorber as well as to the source of steam and a control valve can be connected between the first steam jet injector and the source of steam.

A heat pump is a device which transfers heat from a cooler reservoir to a hotter one, expending mechanical energy in the process, especially when the main purpose is to heat the hot reservoir rather than refrigerate the cold one. A depletion line is a line carrying the depleted multicomponent mixture. A saturation line is a line carrying the saturated multicomponent mixture. An absorber is equipment in which gas is absorbed by contact with a liquid. A boiler is an apparatus for generating steam or vapor from a solution. An injector comprises an apparatus containing a nozzle in an actuating fluid which is accelerated and thus entrains a second fluid, so delivering the mixture against a pressure in excess of the second fluid.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWINGS

In the accompanying drawings, in which are shown two of the various possible embodiments of the present invention FIG. 2 is a view of a schematic diagram of the construction of an embodiment of the present invention comprising a heat transformer with a coupled heat pump and a vapor compressor connected in series.

DESCRIPTION OF INVENTION AND PREFERRED EMBODIMENTS

Figure 1:
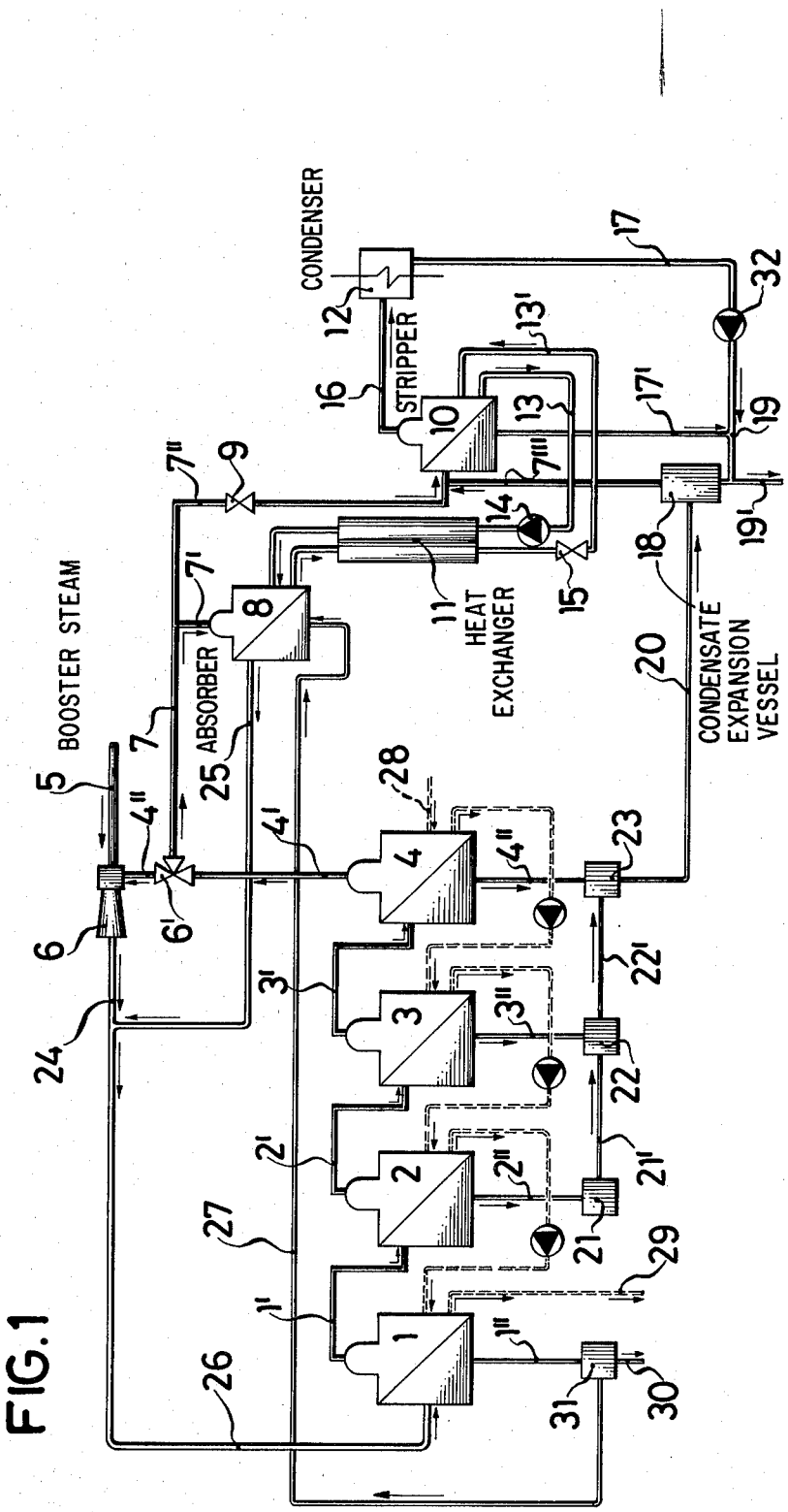
FIG. 1 is a view of a schematic diagram of the construction of an embodiment of the present invention with a heat transformer having an integrated heat pump and a parallel thereto disposed and operated steam jet injector in the context of a four stage evaporator.

In accordance with the present invention there is provided a multistage evaporator comprising an evaporator part and a heat regenerator part, which at least in part transforms the heat contained in the vapors of the evaporator part again into useful heat having a temperature being substantially above the temperature of the vapors and the heat regenerator comprises a combination of a vapor compressor with a heat pump.

The vapors from one or more of the evaporator stages can be fed back in part to a steam jet injector and in part to a heat pump. The heat pump can also be a plant working in accordance with the principle of a heat transformer. The vapors from one or more evaporator stages can be completely fed to a heat pump. They can be there at least in part without substantial expenditure in higher-valued energy transformed into steam of higher temperature and thereupon be pressurized in a vapor compressor to the required process steam pressure. The steam leaving the vapor compressor can be admixed to the process steam operating the evaporator plant. A steam jet injector can be employed as a vapor compressor to which steam under high pressure as booster steam is fed via a by-pass line. The high pressure steam not running through the by-pass line can either in an additional steam jet injector or by throttling and water injection be brought to the level of the process steam and can be fed together with the mixed steam of the first steam jet injector into the first evaporator stage. The vapor compressor can be a mechanical compressor driven by a heat engine, which expands steam to the level of the steam leaving the compressor and which can be fed with the same together to the evaporator part as process steam. The vapors fed to the heat pump can in part be directly fed to an absorber containing an unsaturated multicomponent mixture, which absorbs the vapors under heat development. The multicomponent mixture after saturation, the so-called rich solution, can be fed via a line to a stripper or boiler, which is under lower pressure compared to the absorber and wherein the saturated multicomponent mixture is regenerated by evaporation of the absorbed component. The regenerated mixture or the so-called depleted mixture, is fed back to the absorber with a pump and the depleted mixture is heat contacted after the pump with the saturated mixture before the saturated mixture is throttled to the lower boiler pressure. The heat required for evaporating the absorbed component in the boiler can have the same or a different temperature as the vapors introduced into the absorber and in particular the vapors from one or more stages of the evaporator part can be employed for heating.

The part of the vapors intended for the heat pump can be fed to a boiler stage and to an evaporator stage, where by heat contact with the vapor in the boiler stage low boiling components of the multicomponent mixture are vaporized, then following liquefied in a condenser, then transported with a pump to the evaporator stage standing under a higher pressure, there again vaporized by heat contact with the vapors and following the low boiling components are absorbed in an absorption stage under heat development by a multicomponent mixture depleted in low boiling components. The boiler stage and the absorption stage are connected such by way of conduits that in one conduit the multicomponent mixture saturated after the absorption is throttled to the boiler pressure and fed into the boiler and via another line the multicomponent mixture depleted in low boiling component is removed from the boiler and is fed back by way of a pump in the absorber standing under a higher pressure. The saturated and the depleted multicomponent mixture are at the higher pressure in the same way brought into heat contact as the under higher pressure standing liquid low boiling components with the vaporized low boiling components after the boiling step.

The vaporized components leaving the boiler stages can be liquefied at lower temperature and advantageously at room temperature. The heat contained in the vapor condensates of the evaporator stages being part of the evaporator can in addition be employed for heating the boiler and/or evaporator stages of the heat regenerator. The absorber stages can be provided on the heat output side with a steam generating system. The vapor lines going to the heat regenerating part can be connected with each other such that by way of control valves the vapor parts intended for the heat pump and for the vapor compressor part can be adjusted as desired dependent or independent from each other.

The present invention provides to feed a part of the vapors from the last or one of the last stages of the evaporator to a steam jet injector and to feed the part of the vapors, which cannot be pressurized with the injector, to a heat pump, where at least part of the heat is brought to a higher temperature and in particularly is lifted to the temperature level of the steam mixture behind the steam jet injector. If the temperature difference between the vapors and the heating steam in the first or one of the first evaporator stages is too large as to allow to be bridged solely by the heat pump, then the problem is resolved such that the complete vapors of the last or one of the last evaporator stages is fed to the heat pump part and the steam generated in the heat pump of higher temperature is thereupon compressed with vapor compressors to the level of the process steam.

The heat pump wherein the vapors are lifted to a higher temperature level at least in part without substantial employment of higher value energy and which heat pump especially serves for the generation of steam is constructed as integrated unit that is the vapors are absorbed by the operating material mixture circulating in the heat pump as the low boiling and easier volatile component, the so-called working medium, and the low boiling components are then reevaporated from the mixture at lower pressure.

In evaporator plants where the example water is evaporated there can be employed as working mixture in the heat pump part for example mixtures of lithium bromide and water ($LiBr-H_2O$), sodium hydroxide and water ($NaOH-H_2O$) or potassium hydroxide and water ($KOH-H_2O$). Similarly the heat pump part or heat transformer part can be of coupled construction. In this case the material streams running through the evaporator part and through the heat pump part are completely separated from each other.

The heat transformer part or heat pump part and the vapor compressor part are connected such to each other that the parts of the vapors to be fed to the two parts can be independently from each other controlled and in particular if desired the vapors can be completely fed to the heat pump or to the vapor compressor. In addition for the purpose of a larger temperature increase the heat pump part can be such connected to the evaporator part that the vapors employed for heating the boiler stages can be withdrawn from a different stage of the evaporator part as the stage which is via a vapor line connected to the absorber. In a heat pump of coupled construction this feature is achieved by heating the boiler stages and the working medium evaporator of the heat pump with vapors of different temperature.

Referring now to FIG. 1 there is shown a schematic diagram of a multistage evaporator with four stages 1, 2, 3, 4 and the evaporator is fed via line 26 with process steam. The evaporator stages are connected to each other via the vapor lines 1', 2', 3'. The novel apparatus comprises as substantial components a steam jet injector 6, and a heat transformer constituted by an absorber 8, a stripper or boiler 10, a heat exchanger 11 and a condenser 12.

The vapors of the last evaporator stage are fed via line 4' to a distributor 6'. The distributor 6' is via line 4" connected to a steam jet injector 6 and via lines 7 and respectively 7' and 7" to the heat output side (absorption side) of the absorber 8 and to the heat output side of the boiler 10. A part of the vapors in line 4' passes via line 4" to the steam jet injector 6 and is there compressed to the level of process steam with the booster steam from line 5. The excess part in line 7, the amount of which is substantially determined by the enthalpy values of vapors and of the booster steam passes in additional parts via lines 7 and 7' to the absorber 8, where it is absorbed by the suitable multicomponent mixture present, and via lines 7 and 7" to the boiler 10, where it gives heat via condensation to the multicomponent mixture removed from the absorber 8 via line 13'.

The boiler 10 is fed via an additional feed line 7''' also with vapor, which is taken from a condensate expansion vessel 18, into which the condensate from the evaporator stages 2, 3, 4 and collected in the collector vessels 21, 22 and 23 is brought via line 20. The control valve 9 serves to adjust the amounts of vapor required in each case in the apparatus 8 (absorber) and 10 (boiler).

The absorber 8 is provided on the heat input side with a steam generator system and is connected via lines 27 with the condensate collector vessel 31 as well as via line 25 to the vapor line 24. The vapors from the lines 24 and 25 are fed jointly to the first evaporator stage 1 as process steam. The absorption part (heat output side) of the absorber 8 is fed continuously with a depleted multicomponent mixture via line 13, which absorbs the vapors fed via line 7' under heat development until saturation is reached. The saturated mixture leaves the absorber 8 via line 13', transfers heat in the heat exchanger 11 to the colder mixture in line 13 and is fed to the boiler 10 after throttling in the pressure reducing valve 15. In the boiler 10 the vapors absorbed in the absorber 8 are again vaporized at lower pressure by heat transferred from the vapors passed into the boiler via lines 7" and 7'''. The mixture regenerated in this manner is withdrawn via line 13 and is by way of pump 14 pumped back into the absorber 8 after absorption of heat in the heat exchanger 11. The vaporized vapors leave the boiler 10 and are liquefied in the condenser 12 at lower temperature such as for example room temperature. The condensate is withdrawn via line 17 and mixed with the condensate from line 17' and via line 19 with the condensate from line 19'.

EXAMPLE 1

An aqueous solution to be concentrated passes successively the evaporator stages 4, 3, 2 and 1 as shown in FIG. 1. The temperature of the heating steam for the stage 1 is 110° C. and the vapors leaving stage 4 have a condensation temperature of 70° C. The saturated steam available has a temperature of 200° C. The temperature of the cooling fluid is 15° C.

In view of the temperature and pressure situation present for each kg of booster steam about 0.27 kg of vapors leaving the evaporator 4 at a pressure of about 0.31 bar can be compressed to 1.43 bar corresponding to a temperature of 110° C. The excess vapors are fed to the heat pump part. About 52 percent of the excess vapors pass via line 7' into the absorber 8, to which at the same time is fed an aqueous solution such as for example a lithium bromide-water mixture with about 62 parts of lithium bromide or a sodium hydroxide solution with about 57 percent parts of sodium hydroxide NaOH at a pressure $p_A \leq 0.31$ bar. The vapors are absorbed by the lithium bromide-water mixture or the sodium hydroxide solution under development of heat to the state of saturation, the saturated solution is withdrawn via line 13'. After heat emission in the heat exchanger 11 the solution is throttled in the pressure reducing valve 15 to a pressure $p_H \leq 0.023$ $bar_g$ and then fed to the boiler 10. By way of the developing absorption heat, which is released in the absorber 8 at an average temperature of about 114° C., the heating condensate fed in via line 27 and having a temperature of about 100° C. can evaporate again and the vapor with a temperature of about 110° C. can be admixed via line 25 to the steam in line 24 leaving the steam jet injector 6.

The saturated materials mixture passing into the boiler 10 via line 13' is contacted for heat exchange with the steam brought in via lines 7" and 7"'. Thereby, the vapors absorbed in the absorber 8 are again vaporized from the mixture at a temperature of about 65° C., are fed via line 16 to a condenser 12 and are liquefied there at a temperature of about 20° C. The regenerated mixture, which comprises about 5 percent water less than the saturated mixture after the absorption step, is removed from the boiler 10, transported by way of pump 14 to the heat exchanger 11 and then passes back into the absorber 8. The ratio of the amount of steam transported in lines 7" and 7"' compared to in line 7' is about 1.2:1.

In the apparatus shown there is possible with the indicated temperature and pressure situations as well as the recited process conditions to generate about 2.20 kg heating steam of a temperature of about 110° C. by employing 1 kg of booster steam of a temperature of 200° C. This corresponds to a specific steam use of the total plant of 0.136 kg for each kg of evaporated water and this value is about 55 percent lower than what can be reached for comparable four stage evaporators without heat recovery system and which can theoretically only be reached by a nine stage evaporator.

EXAMPLE 2

A solution is boiled down in a multistage evaporator and the vapors of the last stage are unsuitable for application of thermal compression. The temperature of the heating steam of the first stage is 130° C. and the condensation temperature of the vapors from the last stage is 70° C. Superheated steam at 16 $bar_g$ and a temperature of 215° C. is available as process steam. The temperature of the cooling fluid is 15° C.

The heat recovery part is constructed as shown in FIG. 2. The main difference in the heat pump part compared with the embodiment of FIG. 1 comprises an additional evaporator 33, an additional heat exchanger 34 and the connecting lines 16' and 35, which connect the evaporator 33 in each case with the condenser 12 and respectively the absorber 8.

The vapors in line 7' are therefore not fed directly to the absorber 8, but are employed for the evaporation of the in the boiler 10 vaporized, then in condenser 12 liquefied and with pump 32 to the evaporator 33 transported lower boiling component. This construction for the process is in fact more elaborate with respect to the apparatus and is slightly less favorable relative to the energy efficiency, however, one is free in the choosing of the absorption medium, since the vapors are not employed simultaneously as a working medium for the absorption process. Therefore, also the heat contents of such vapors can be used which are either loaded heavily with foreign materials or for which no suitable absorption partners can be found.

As a pair of working materials is employed the mixture of ammonia-water, where ammonia is the lower boiling component. The ammonia is vaporized in the boiler 10 at a temperature of about 65° C., liquefied in the condenser 12 at 20° C., then evaporated in the evaporator 33 at a temperature of 65° C. and reabsorbed in the absorber 8 under a pressure p=27 $bar_g$ by the weaker concentrated solution from line 13. The ammonia concentration after the boiling process amounts to 46 percent and the ammonia concentration after the absorption process amounts to 51 percent.

Under the condition that the hot water at a pressure of 1 bar has approximately boiling temperature and the water flows to the absorber 8 via line 27, then the apparatus shown produces for each kg vapors, which are fed to the heat pump part via lines 7', 7", 7"' about 0.41 kg saturated steam of a temperature of about 100° C. This steam is compressed in the steam jet injector 6 by the booster steam from line 5 (16 $bar_g$, 215° C.) to 2.7 bar corresponding to a saturation temperature of 130° C. The amount of booster steam required for this purpose amounts to about 2.1 kg for each kg suction steam. For each kg of process steam of the state indicated above are therefor made available 1.48 kg heating steam of 130° C. for the first evaporator stage. This corresponds to a lowering of the specific steam use of 32 percent versus the one for a multistage evaporator, which operates with the same number of stages, but without the above described heat recovery part in the temperature range 130° C./70° C.

In stationary state the steam jet injector 6 is not in operation and the valve 37 is open only toward the line 26. In case the operating conditions change such as for example upon start up of the plant, upon a dropping of the vapor temperature or upon a lowering of the amount of steam or temperature of steam in line 25, then in addition the steam jet injector 6' of FIG. 2 is put in operation, to which booster steam is fed via line 5' of the same quality as that of line 5. The steam jet injector 6' of FIG. 2 can be operated such that the pressure of the mixed steam distinguishes only insubstantially from the pressure of the suction steam and thus the apparatus serves only to control the quantity. Alternatively, the apparatus can be constructed such that at this point the steam mixture leaving the first steam jet injector is compressed again for the purpose of an additional substantial temperature increase.

The advantages provided by the present invention comprise in particular that the heat recovered is generated as process steam which can be employed again in the process itself. Therefor, the primary energy expense for the evaporation process is considerably reduced when compared with multistage evaporators of the same number of stages and of the same throughput. The invention allows to combine the advantages of the multistage evaporators with those of the vapor compressors without the use of the advantages of the one process degrading disadvantageously the operation of the other process. In addition to the two embodiments shown it is of course also possible to influence advantageously the hitherto applied method of vapor compression with steam jet injectors by compressing a part of the vapors of the first evaporator stage by way of a steam jet injector in conventional manner, feeding the mixed steam of the first stage again to the heating side and conducting the excess vapors to successive evaporator stages, which are combined with a heat pump. In this case the steam generated by the heat pump part is fed together with the excess vapors from the first evaporator stage to the second evaporator stage.

An additional advantage of the method and apparatus of the present invention comprises the reduction in the thermal loading of the environment and therefor there results a reduction in the capital investment and operating expenditures for cooling apparatus required for thermal processes.

It will be understood that each of the elements described above, or two or more together, may also find a useful application in other types of system configurations and evaporator constructions differing from the types described above.

While the invention has been illustrated and described as embodied in the context of a multistage evaporator, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A multistage evaporator comprising
    an evaporator section including a plurality of evaporating stages;
    a vapor compressor connected to the evaporator section; and
    a heat pump connected to the evaporator section.

2. The multistage evaporator according to claim 1 wherein the vapor compressor is a steam jet injector.

3. The multistage evaporator according to claim 2 wherein one or more of the evaporator stages are in part connected to the steam jet injector and in part to the heat pump.

4. The multistage evaporator according to claim 2 further comprising
    an additional steam jet injector connected to the first evaporation stage.

5. The multistage evaporator according to claim 1 wherein the heat pump transforms the vapor from one or more evaporator stages fed to the heat pump; and further comprising
    a compressor connected to the heat pump for compressing the vapor to the required process pressure.

6. The multistage evaporator according to claim 5 further comprising
    a heater for the boiler fed with vapors from one or more stages of the evaporator.

7. The multistage evaporator according to claim 1 wherein the evaporator section further comprises
    a heat input;
    a condensate output;
    a vapor output;
    wherein the vapor compressor further comprises
    a source of steam;
    a steam jet injector connected to the source of steam for providing steam power and to the heat input of the evaporator section;
    a distributor valve connected to an input of the steam jet injector;
    wherein the heat pump further comprises
    an absorber connected to the condensate output of the evaporator and to the heat input of the evaporator on its output side, and to a port of the distributor valve;
    a heat exchanger connected via a saturation line and a depletion line to the absorber;
    a pressure reducing valve connected via the heat exchanger to the saturation line;
    a boiler connected to the pressure reducing valve to receive feed and having an output for depleted mixture;
    a pump connected to the output for depleted mixture of the boiler and to the depletion line of the absorber via the heat exchanger;
    a condenser connected to the boiler; and
    a control valve connected to the distributor valve and to the boiler heating provision for controlling the amounts of vapors required in the absorber and the boiler heating supply.

8. The multistage evaporator according to claim 7 wherein the vapor output of the last evaporator stage is connected to the distributor valve.

9. The multistage evaporator according to claim 7 further comprising a vaporizer connected to the control valve and the absorber.

10. The multistage evaporator according to claim 9 further comprising
    a heat exchanger connected between the boiler and the condenser and between the condenser and the vaporizer.

11. The multistage evaporator according to claim 10 further comprising
    a pump disposed in the line from condenser to vaporizer and located between heat exchanger and condenser.

12. The multistage evaporator according to claim 7 further comprising
    a second steam jet injector connected between the distributor valve and the absorber as well as to the source of steam; and
    a control valve connected between the first steam jet injector and the source of steam.

13. The multistage evaporator comprising an evaporator section including a plurality of evaporating stages; a vapor compressor connected to the evaporator section; a heat pump connected to the evaporator section; the vapor compressor being a mechanical compressor; and further comprising a thermal engine connected to the mechanical compressor for driving the same and for expanding steam to the level of the steam leaving the mechanical compressor.

14. The multistage evaporator comprising an evaporator section including a plurality of evaporating stages; a vapor compressor connected to the evaporator section; a heat pump connected to the evaporator section; and wherein the heat pump comprises an absorber fed with vapor.

15. The multistage evaporator comprising an evaporator section including a plurality of evaporating stages; a vapor compressor connected to the evaporator section; a heat pump connected to the evaporator section; and wherein the evaporator section further comprises a heat input; a condensate output; a vapor output; wherein the vapor compressor further comprises a source of steam; a steam jet injector connected to the source of steam for providing steam power and to the heat input of the evaporator section; a distributor valve connected to an input of the steam jet injector; wherein the heat pump further comprises an absorber connected to the condensate output of the evaporator and to the heat input of the evaporator on its output side, and to a port of the distributor valve; a heat exchanger connected via a saturation line and a depletion line to the absorber; a pressure reducing valve connected via the heat exchanger to the saturation line; a boiler connected to the pressure reducing valve to receive feed and having an output for depleted mixture; a pump connected to the output for depleted mixture of the boiler and to the depletion line of the absorber via the heat exchanger; a condenser connected to the boiler; and a control valve connected to the distributor valve and to the boiler heating provision for controlling the amounts of vapors required in the absorber and the boiler heating supply.

16. A method for multiple stage evaporating comprising
compressing part of the exhaust vapor to provide process steam with a vapor compressor;
pumping another part of the exhaust vapor of the evaporator with a heat pump for production of process steam;
feeding process steam to the first stage of a multiple stage evaporator; and
returning part of the cooled process steam to the heat pump.

17. The method for multiple stage evaporating according to claim 16 wherein
part of the exhaust vapor of the evaporator is compressed to process steam with a steam jet injector.

18. The method for multiple stage evaporating according to claim 16 wherein the compressing and the heat pumping are performed simultaneously.

19. The method for multiple stage evaporating according to claim 16 further comprising
feeding the vapor resulting from one or more of the evaporator stages completely to a heat pump for transforming at least part of the vapor into steam of higher energy; and
pressurizing the vapor to a suitable process pressure in a vapor compressor.

20. The method for multiple stage evaporating according to claim 16 further comprising
admixing the vapor resulting from the vapor compressor to the process steam for operating the stages of the multiple stage evaporator.

21. The method for multiple stage evaporating according to claim 16 further comprising
feeding steam under high pressure as booster steam via a by-pass line to a steam jet injector serving as a vapor compressor to provide process steam;
reducing additional high pressure steam to process steam by an additional steam jet injector; and
feeding the process steam from the steam jet injectors to the first evaporating stage.

22. The method for multiple stage evaporating comprising compressing part of the exhaust vapor to provide process steam with a vapor compressor; pumping another part of the exhaust vapor of the evaporator with a heat pump for production of process steam; feeding process steam to the first stage of a multiple stage evaporator; returning part of the cooled process steam to the heat pump, feeding steam under high pressure as booster steam via a by-pass line to a steam jet injector serving as a vapor compressor to provide process steam; reducing additional high pressure steam to process steam through a throttle and water injection; and feeding the process steam to the first evaporating stage.

23. The method for multiple stage evaporating comprising compressing part of the exhaust vapor to provide process steam with a vapor compressor; pumping another part of the exhaust vapor of the evaporator with a heat pump for production of process steam; feeding process steam to the first stage of a multiple stage evaporator; returning part of the cooled process steam to the heat pump, expanding steam to the level of the steam resulting from the compressor via a thermal engine; and driving a compressor providing the compressing with power provided by the thermal engine.

24. The method for multiple stage evaporating comprising compressing part of the exhaust vapor to provide process steam with a vapor compressor; pumping another part of the exhaust vapor of the evaporator with a heat pump for production of process steam; feeding process steam to the first stage of a multiple stage evaporator; returning part of the cooled process steam to the heat pump, feeding vapor from the evaporating stages to an absorber containing an unsaturated multicomponent mixture; and absorbing the vapor with the multicomponent mixture.

25. The method for multiple stage evaporating according to claim 24 further comprising
feeding after the absorbing the now saturated multicomponent mixture called rich solution via a pipe to a boiler which is under lower pressure compared to the absorber;
providing from the enriched solution heat to a heat exchanger; expanding the rich solution in a throttle;
regenerating the saturated multicomponent mixture by evaporating the absorbed components under heat consumption;
pumping the regenerated depleted multicomponent mixture back toward the absorber; and
exchanging heat between the regenerated depleted multicomponent mixture and the saturated multicomponent mixture for warming the depleted mixture.

26. The method for multiple stage evaporating according to claim 25 wherein the heat employed in the boiler has as desired a temperature when compared to the temperature of the vapor fed to the absorber.

27. The method for multiple stage evaporating comprising compressing part of the exhaust vapor to provide process steam with a vapor compressor; pumping another part of the exhaust vapor of the evaporator with a heat pump for production of process steam; feeding process steam to the first stage of a multiple stage evaporator; returning part of the cooled process steam to the heat pump, feeding back vapors intended for the heat pump to a boiler stage and an evaporating stage; vaporizing in the boiler stage at a low pressure low boiling components of a multicomponent mixture; liquefying the low boiling components in a condenser; pumping the liquefied low boiling components with a pump into the evaporating stage being under higher pressure; vaporizing the low boiling components again by contact with the vapors; absorbing thereupon in an absorption stage the low boiling component vapors in a depleted multicomponent mixture under generation of heat; throttling the now saturated multicomponent mixture in a throttle connected to the absorber to a pressure corresponding to that of a boiler stage; feeding the throttled saturated multicomponent mixture to the boiler; removing depleted multicomponent mixture from the boiler; pumping the depleted multicomponent mixture back to the absorber standing under a higher pressure, whereupon the saturated and the depleted mixture are heat contacted at the higher pressure as under the higher pressure standing liquid low boiling components with the vaporized low boiling components after the boiling step.

28. The method for multiple stage evaporating according to claim 27 further comprising
condensing the vaporized components leaving the boiler stages at low temperature.

29. The method for multiple stage evaporating according to claim 28 further comprising condensing the vaporized components leaving the boiler stages at room temperature.

30. The method of multiple stage evaporating comprising compressing part of the exhaust vapor to provide process steam with a vapor compressor; pumping another part of the exhaust vapor of the evaporator with a heat pump for production of process steam; feeding process steam to the first stage of a multiple stage evaporator; returning part of the cooled process steam to the heat pump, employing the heat contained in the vapor condensates of the evaporator stages belonging to the evaporator additionally for heating of the boiler and/or evaporating stages of the heat regenerator.

* * * * *